US009685067B2

(12) United States Patent
Shaw

(10) Patent No.: US 9,685,067 B2
(45) Date of Patent: Jun. 20, 2017

(54) MACHINE-TO-MACHINE (M2M) EMERGENCY COMMUNICATIONS

(71) Applicant: AT&T Intellectual Property I, LP, Atlanta, GA (US)

(72) Inventor: Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/068,154

(22) Filed: Oct. 31, 2013

(65) Prior Publication Data

US 2015/0118988 A1 Apr. 30, 2015

(51) Int. Cl.
| | |
|---|---|
| H04M 11/04 | (2006.01) |
| G08B 23/00 | (2006.01) |
| H04W 4/22 | (2009.01) |
| G08B 13/189 | (2006.01) |
| G08B 13/196 | (2006.01) |
| G08B 17/10 | (2006.01) |
| G08B 21/20 | (2006.01) |
| G08B 25/10 | (2006.01) |

(52) U.S. Cl.
CPC ........... *G08B 23/00* (2013.01); *G08B 13/189* (2013.01); *G08B 13/196* (2013.01); *G08B 17/10* (2013.01); *G08B 21/20* (2013.01); *G08B 25/10* (2013.01); *H04W 4/22* (2013.01)

(58) Field of Classification Search
None
See application file for complete search history.

(56) References Cited

U.S. PATENT DOCUMENTS

| 6,549,827 B1 | 4/2003 | Yen |
| 8,014,763 B2 | 9/2011 | Hymes |
| 8,401,562 B2 | 3/2013 | Chen et al. |
| 2001/0036832 A1 | 11/2001 | McKay |
| 2004/0189460 A1* | 9/2004 | Heaton .................. G08B 25/10 340/500 |
| 2008/0284587 A1* | 11/2008 | Saigh ................ H04M 1/72541 340/539.13 |

(Continued)

FOREIGN PATENT DOCUMENTS

| GB | 2401752 A | 11/2004 |
| KR | 2004/0020362 A | 3/2004 |
| WO | WO 2012/108450 A1 | 8/2012 |

OTHER PUBLICATIONS

Suhonen et al. "Unified Service Access for Wireless Sensor Networks" 2012 Third International Workshop on Software Engineering for Sensor Network Applications (SESENA). Jun. 2012. pp. 49-55.

(Continued)

*Primary Examiner* — Idowu O Osifade
(74) *Attorney, Agent, or Firm* — Baker & Hostetler LLP

(57) ABSTRACT

System, methods, and devices may provide alerts, such as emergency alerts, using machine-to-machine communications. A method may include receiving a state of a mammal associated with a device, receiving a state of an environment that is approximate to the location of the mammal associated with the device, determining a likelihood of a harmful activity based on the aforementioned states, and automatically sending alert message based on the determined likelihood of the harmful activity.

20 Claims, 8 Drawing Sheets

(56) References Cited

U.S. PATENT DOCUMENTS

| | | | |
|---|---|---|---|
| 2009/0160673 A1* | 6/2009 | Cirker | G07C 9/00111 340/12.22 |
| 2009/0215424 A1* | 8/2009 | Petite | 455/404.1 |
| 2009/0309742 A1* | 12/2009 | Alexander | G08B 27/006 340/601 |
| 2010/0057485 A1 | 3/2010 | Luft | |
| 2011/0270984 A1 | 11/2011 | Park | |
| 2012/0166610 A1 | 6/2012 | Doh et al. | |
| 2012/0190295 A1 | 7/2012 | Kim et al. | |
| 2013/0016675 A1 | 1/2013 | Cha et al. | |
| 2013/0031599 A1 | 1/2013 | Luna et al. | |
| 2013/0088352 A1* | 4/2013 | Amis | G08B 15/002 340/540 |
| 2014/0118144 A1* | 5/2014 | Amis | G08B 21/02 340/540 |

OTHER PUBLICATIONS

Surobhi et al. "A Modified M2M-Based Movement Prediction for Realistic Emergency Environments" Wireless Communications and Networking Conference (WCNC), 2013 IEEE. Apr. 2013, pp. 4552-4557.

* cited by examiner

MACHINE-TO-MACHINE (M2M) EMERGENCY COMMUNICATIONS

TECHNICAL FIELD

The technical field generally relates to wireless communications and more specifically machine-to-machine communication.

BACKGROUND

Machine-to-machine (M2M) refers to technologies that allow both wireless and wired systems to communicate with other devices. M2M can include the case of industrial instrumentation including a device (such as a sensor or meter) to capture an event (such as inventory level) that is relayed through a network to an application that translates the captured event into information, such as a message that an item needs to be restocked.

SUMMARY

The following presents a simplified summary that describes some aspects and/or embodiments of the subject disclosure. This summary is not an extensive overview of the disclosure. Indeed, additional or alternative aspects and/or embodiments of the subject disclosure may be available beyond those described in the summary.

As disclosed herein, a first device may receive a state of an entity associated with the first device and a state of an environment that is approximate to the location of the entity associated with the first device. A first likelihood of a harmful activity may be determined based on the state of the entity and the state of the environment and instructions may be provided to send an alert message based on the determined likelihood of the harmful activity.

BRIEF DESCRIPTION OF THE DRAWINGS

The following detailed description is better understood when read in conjunction with the appended drawings. For the purposes of illustration, exemplary embodiments are shown in the drawings; however, the subject matter is not limited to the specific elements and instrumentalities disclosed. In the drawings.

DETAILED DESCRIPTION OF ILLUSTRATIVE EMBODIMENTS

Disclosed herein are methods, systems, and devices for providing alerts, such as emergency alerts using machine-to-machine communications. A state, such as emotional state, of a user (or other entity) may be determined After the state of the entity is determined, proactive responses may help prevent harmful activities from occurring or escalating to an even high level of harm as compared to no response at all. For example, an emotional state may be determined of a person (or persons) near a bank. If an emotional state is at a particular threshold level along with other information, then several different actions may occur. The actions may include alerting security personnel of the bank to be on high alert, alerting police to send extra officers to scout the area, alerting bystanders to stay away from the area, restricting areas of the bank to some or all people (e.g., locking down the vault for a time period), or the like.

Figure 1:
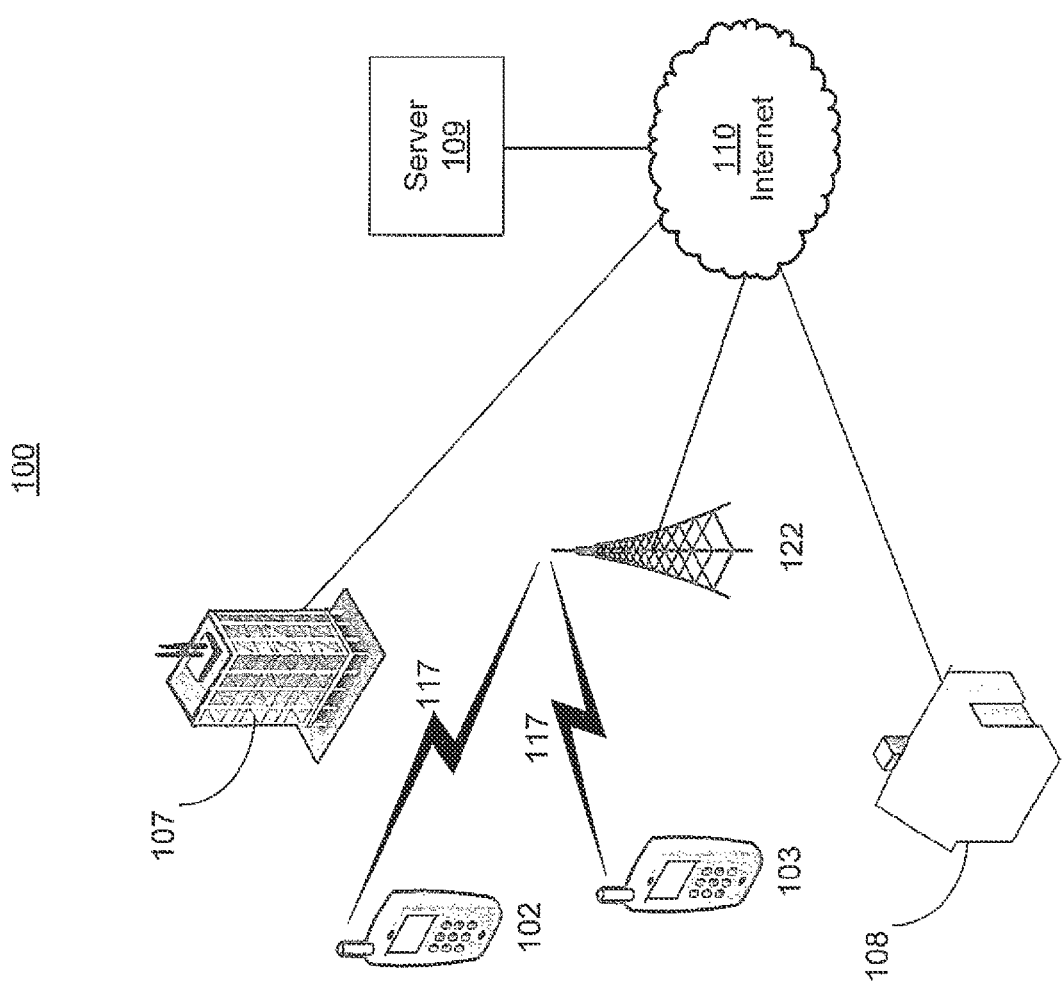
FIG. 1 illustrates an exemplary communications system in which one or more disclosed embodiments may be implemented.

FIG. 1 illustrates a communications system 100 in which one or more disclosed embodiments may be implemented. The communications system 100 may be a multiple access system that provides content, such as voice, data, video, messaging, broadcast, etc., to multiple wireline or wireless devices. The communications system 100 may enable multiple devices to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1, the communications system 100 may include wireless transmit/receive unit (WTRU) 102, WTRU 103, a server 109, the Internet 110, and other networks (not shown), though it will be appreciated that the disclosed embodiments contemplate any number of WTRUs, base stations, networks, and/or network elements. Internet 110 may be communicatively connected to a plurality of devices located in building 107 or building 108. The plurality of devices may include WTRUs, smoke detectors, cameras, motion detectors, garage door openers, light switches, appliances (e.g., fridge or microwave), and door locks, among other things. Each of the WTRUs 102 or 103 may be any type of device configured to operate and/or communicate in a wireless environment. By way of example, WTRU 102 and WTRU 103 may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, or the like.

The communications system 100 may also include a base station 122. Base station 122 may be any type of device configured to wirelessly interface with at least one of the WTRUs 102 or WTRU 103 to facilitate access to one or more communication networks, such as the Internet 110 and/or the networks. By way of example, base station 122 may be a base transceiver station (BTS), a Node B, an eNode B (eNB), a Home Node B (HNB), a Home eNB, a site controller, an access point (AP), a wireless router, or the like. While base station 122 is depicted as a single element, it will be appreciated that base station 122 may include any number of interconnected base stations and/or network elements.

Base station 122 may be configured to transmit and/or receive wireless signals within a particular geographic region, which may be referred to as a cell (not shown). The cell may further be divided into cell sectors. For example, the cell associated with base station 122 may be divided into three sectors. Thus, in an embodiment, base station 122 may include three transceivers, i.e., one for each sector of the cell.

Base station 122 may communicate with one or more of WTRUs 102 or 103 over air interface 117, which may be any suitable wireless communication link (e.g., radio frequency (RF), microwave, infrared (IR), ultraviolet (UV), visible light, etc.). Air interface 117 may be established using any suitable radio access technology (RAT).

In an embodiment, base station 122 and WTRU 102 and WTRU 103 may implement a radio technology such as Evolved UMTS Terrestrial Radio Access (E-UTRA), which may establish air interface 117 using Long Term Evolution (LTE) and/or LTE-Advanced (LTE-A).

Figure 2:
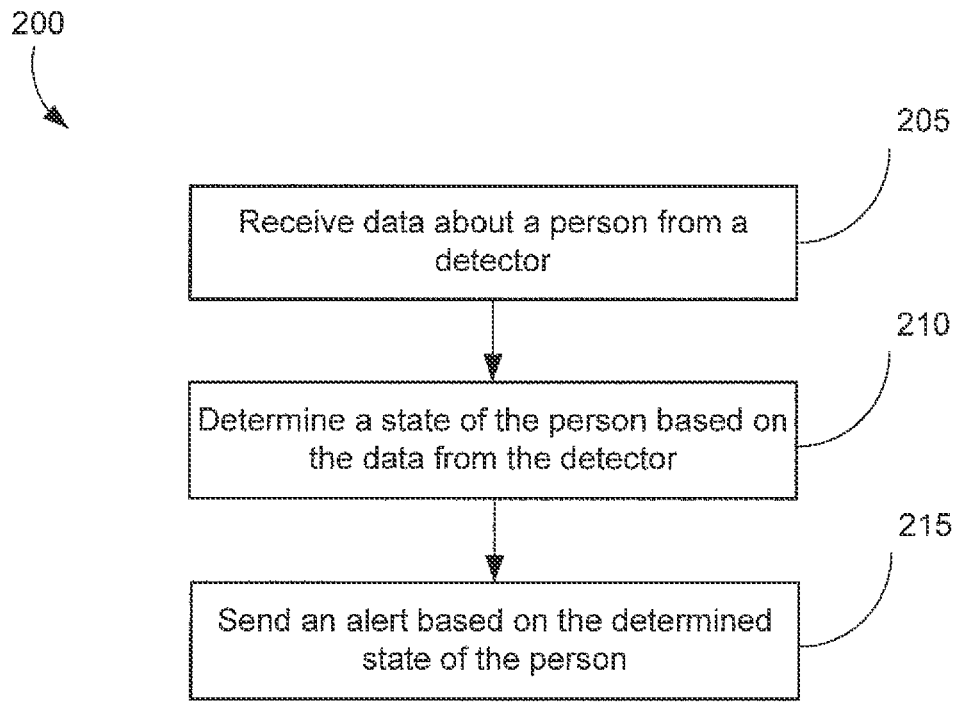
FIG. 2 illustrates an exemplary method for machine-to-machine emergency communications.

FIG. 2 illustrates an exemplary method 200 for a machine-to-machine emergency alert system. At block 205, a processor may receive data about a person from a detector (e.g., a device may detect vital signs and mannerisms). At block 210, a state of the person (e.g., emotional state or location) may be determined based on the received data from the detector. At block 215, an alert may be sent based on the determined state of the person.

In an embodiment, WTRU 102 may be associated with a user and may be equipped with a plurality of detectors which relay data that help determine the state of a user. The detectors of WTRU 102 may include a heart rate detector, a finger print detector, an iris detector, a facial recognition detector, a location detector (e.g., a global position system (GPS)), a voice recognition detector, a voice volume detector (e.g., a raised voice may be informative), or a camera, among other things. Some or all of the features may be located within devices external to WTRU 102. WTRU 102 may be communicatively connected with external features. For example, heart rate may be detected using a device external to, but communicatively connected with, the WTRU (e.g., a bracelet shaped heart rate detector on the wrist).

In an embodiment, WTRU 102 may record data received from a detector and save it locally or to an external database. The external database may be located on server 109. An alert may be communicated based on the history of detections by WTRU 102 or a person (or animal, such as a dog or cat) approximate to the location or otherwise associated with WTRU 102, an emotional state of a person, a general threshold detection level based on tendencies of other people, or the like. A person may be associated with a user device based on a user profile with WTRU 102, based on holding WTRU 102, or based on a location (e.g., same building or street block) in relation to the WTRU to be detected by a detection device communicatively connected with WTRU 102, among other things. A determination of harmful or potentially harmful situation (likelihood of a harmful situation) may be computed by WTRU 102, server 109, or another computing device. Alerts may be communicated to the user, communicated to people in an affected area, communicated to other machines/devices, communicated to law enforcement or another agency, or the like. A harmful situation or a harmful act discussed herein may consist of a crime (e.g., arson, theft, battery, etc. . . . ), another disruptive behavior that may be a precursor to a crime, or a health issue that may be helped by immediate or proactive assistance (e.g., heart attack or stroke).

An alert may be communicated in the form of a text message, electronic mail message, a recorded voice message, a siren or other audible sound, a vibration, or the like. For example, WTRU 102 may be associated with a user that is suspected of having a high likelihood of instigating a harmful act. WTRU 103 may be associated with a user with no or a low likelihood of instigating a harmful act (e.g., a bystander), but is in the same area (e.g., same store or bank) as the user of WTRU 102. A text message alert may be sent to WTRU 103 recommending the user of WTRU 103 move to another location (e.g., leave the store). The text message may include a specific location. In an embodiment, the text message alert to WTRU 103 may ask for additional information about the user associated with WTRU 102. The text message alert may include a picture of the user of WTRU 102 so that the user of WTRU 103 may identify the user of WTRU 102. The additional information may be a multiple choice questionnaire or the like that helps determine the mannerisms and criminal or otherwise harmful situation instigated by the user of WTRU 102. In an embodiment, the text message alert may plainly ask if the user of WTRU 103 recommends sending authorities after assessing the user of WTRU 102. In a scenario, the user of WTRU 103 may be a former spouse of the user of WTRU 102 and the harmful behavior may be related to previous altercations. In another scenario, the user of WTRU 103 may be security personnel at a facility (e.g., a bank or jewelry store) that is closed for the day, while the user of WTRU 102 may be on probation for a crime against a similar facility. In an embodiment in attempt to stop a harmful situation from happening, the user of WTRU 102, which is suspected of a high likelihood of instigating a harmful act, may receive an alert advising that the user is suspected of a high likelihood of instigating a harmful act.

An alert may be communicated to other machines. For example, an alert from WTRU 102, which is associated with a user suspected of instigating a current or future harmful activity, may be sent to the vehicle owned by, transporting, or near a user of WTRU 102. The alert may disable all or some functions of the vehicle. A maximum speed may be set, the engine may be turned off, the engine may not be allowed to be turned on, the vehicle doors may be locked or unlocked, or key fobs may be disabled (e.g., fobs that are required to be in the car to allow the engine to be turned on), among other things. In an embodiment, an alert from WTRU 102 may lock some or all doors or turn off power to some or all devices of building 107 or building 108. In an embodiment, an alert may be sent from server 109 or another device.

An alert may include different threat levels. As discussed herein, the alert may be based on one or more detection thresholds or detection patterns from WTRU or a detector external to WTRU 102, such as cameras or other detectors in building 107 or building 108. In a scenario, during a period of time based on a pattern that is associated with a behavior that results in harmful situation, a WTRU 102 may have a particular threat level associated with it. Building 107 and building 108 may have a threshold threat level for the building or different threshold threat levels for particular devices in the building. So, for example, to enter building

107, which may be a security sensitive government site, the threshold threat level may be 6 or lower. A threat level of 5 may be a threshold level to send an alert to a security guard of building 107 to look for abnormal behavior with regard to the person associated with WTRU 102. A threat level of 6 may be a threshold level to disable access to certain devices, network sites, rooms, functionality of WTRU 102 (e.g., data/wireless access), weapons, or the like in building 107. The disabled access may be based on the proximity of the user associated with WTRU 102 to a device. Access may be disabled for all people or some people (e.g., people with devices associated with a certain threat level) not just the user associated with WTRU 102. A threat level of 7 may be a threshold level to send an alert to a security guard or law enforcement personnel to detain the user associated with WTRU 102. The threat levels may change throughout the time period the user of WTRU 102 is within the building. So, for example, a threat level may start at 2 for the user of WTRU 102 before entering building 107 and may increase to a threat level of 7 within a few minutes or hours based on the determined state of the user of WTRU 102.

Harmful activity, threat level, or the like of a person may be based on an emotional state of a person. Emotional state may be based on aforementioned features such as output of a heart rate detector, facial recognition detector, GPS (e.g., in relation to abnormal movement), voice volume detector (e.g., detecting a raised voice), websites visited (e.g., making bombs), or the like. As discussed herein, an alert may be sent and the capability of one or machines may be disabled or functionality reduced based on the state (e.g., emotional state) of a person.

Figure 3:
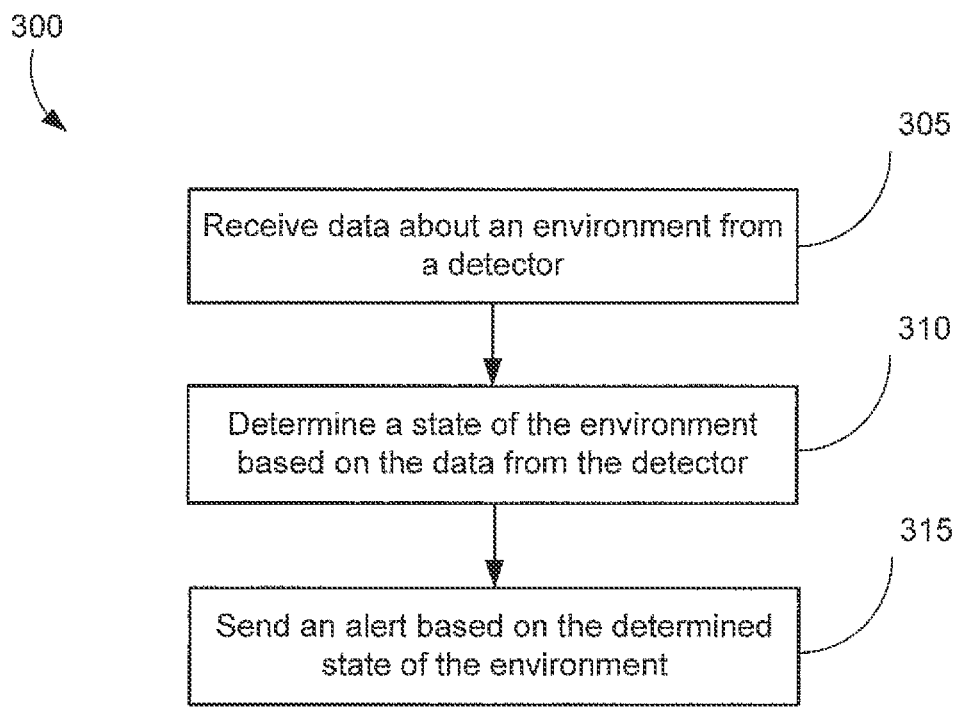
FIG. 3 illustrates an exemplary method for machine-to-machine emergency communications.

FIG. 3 illustrates an exemplary method 300 for a machine-to-machine emergency alert system. At block 305, a processor may receive data about an environment from a detector (e.g., a camera or smoke alarm). At block 310, a state of the environment (e.g., fire or flooding) may be determined based on the data from the detector. At block 315, an alert may be sent based on the determined state of the environment.

In an embodiment, there may be a plurality of detectors which relay data that help determine the state of an environment. The detectors may include a fire detector, a smoke detector, a camera, a global position system (GPS), a wireless phone, gas detector, temperature detector, or wind speed detector, among other things. Some or all of the detection features may be located within one or more devices (e.g., WTRU 102). In an embodiment, data received from the detectors may be saved locally or to an external server or database (e.g., server 109). A determination of an emergency may be computed by the local detection device, a server (e.g., server 109), or another computing device after taking into account the detections along with the history of detections within an environment, general threshold detection levels based on similar environments, or the like. A determined emergency may then be communicated via an alert.

An alert may be communicated to people in an affected area, communicated to other machines/devices, communicated to emergency personnel, or the like. And an alert may be communicated in the form of a text message, an electronic mail message, a recorded voice message, a siren or other audible sound, or a vibration, among other things. For example, there may be a fire that encompasses an area and has the potential to encompass an even larger area. In an embodiment, there may be detectors and other devices positioned throughout structures, such as houses, as well as throughout an area, such as on utility poles, vehicles, trees, wireless telephone towers, animals, and the like. In the structures, there may be devices such as smoke detectors, security systems, and the like. In a scenario where a fire starts in a single structure, the devices in the structure may talk with each other, in order to assist in making decisions. A smoke alarm may be able to detect the intensity of a fire or smoke and determine that an alert should be automatically sent to emergency personnel. In addition the smoke alarm may send an alert message to some or all the machines in the structure. If a machine receives the alert message, then the machine may determine if it should shutdown, perform memory backup, further broadcast status of the machine, or the like. If a machine is not able to respond to an alert message, then another machine may determine if power should be shut down (e.g., via a circuit breaker) to the nonresponsive machine. When there is a fire an alert may be sent within the structure to turn off or otherwise secure devices that may contribute to the proliferation of the fire (e.g., a supply of natural gas line may be shutoff for a home). A machine in a structure may communicate (if determined necessary) with other nearby machines in adjacent structures in order to automatically secure devices that may contribute to the proliferation of the fire. Machine-to-Machine communication may assist in determining the direction of the danger (e.g., fire or tornado) and an optimal solution in minimizing harm, such as turning off power, rerouting power, communicating to persons near the danger via a WTRU, automatically prioritizing targets for emergency personnel, or otherwise automatically directing emergency personnel. In an embodiment, devices placed on wild animals, may be able to assist in predicting or tracking natural events such as tornados, hurricanes, fires, and the like.

Although a person or other living creature associated with a WTRU is discussed herein, a person may be monitored by external devices and may not have a WTRU. The external device (e.g., camera, scanners, etc. . . . ) may monitor the movements and mannerisms of a person and cause the same alerts to be generated as discussed herein. Harmful situations as discussed herein may include sicknesses (e.g., heart attack or stroke) or natural events, such as floods, fires, earthquakes, acts of animals (e.g., beetles eating crops), plagues, or other natural events. An alert and an alert message are used interchangeably herein. As discussed herein, the system and methods may be used to evaluate how to react to an entity that includes something that is non-living (e.g., devices) or a living creature (e.g., humans, trees, dogs, cats, alligators, bears, birds, etc.). For example, the systems disclosed herein may be used to alert animal control, animal associated emergency personnel, security, the owner of an animal, or the like based on the state (e.g., emotional state) of the entity.

Figure 4:
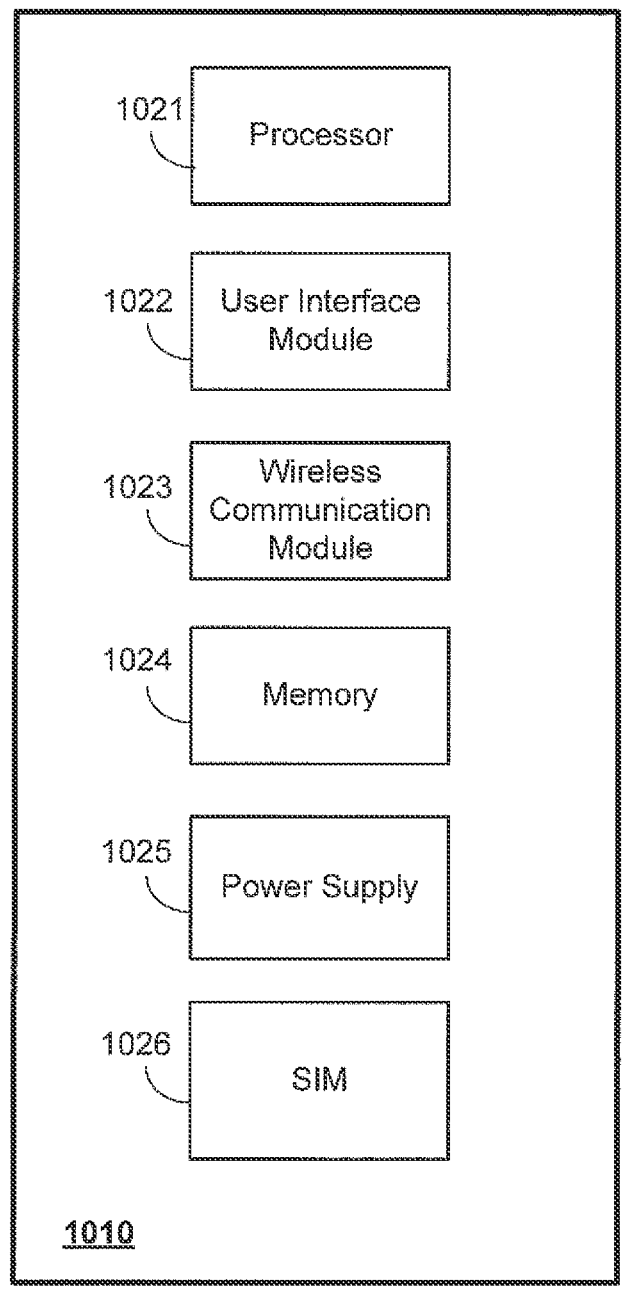
FIG. 4 is a block diagram of a non-limiting exemplary mobile device in which one or more disclosed embodiments may be implemented.

FIG. 4 illustrates an example wireless device 1010 (i.e., WTRU) that may be used in connection with an embodiment. References will also be made to other figures of the present disclosure as appropriate. For example, mobile devices 102 and 103 may be wireless devices of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware or hardware and software.

Processor 1021 may be any type of circuitry that performs operations on behalf of wireless device 1010. Such circuitry may include circuitry and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one embodiment, processor 1021 executes software (i.e., computer readable instructions stored in a computer readable medium) that may include functionality related to M2M emergency communications, for example. User interface module 1022 may be any type or combination of hardware and software that enables a user to operate and interact with wireless device 1010, and, in one embodiment, to interact with a system enabling the user to place, request, and/or receive calls, text communications of any type, voicemail, voicemail notifications, voicemail content and/or data, and/or a system. For example, user interface module 1022 may include a display, physical and/or "soft" keys, voice recognition software, a microphone, a speaker and the like. Wireless communication module 1023 may be any type of transceiver including any combination of hardware and software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
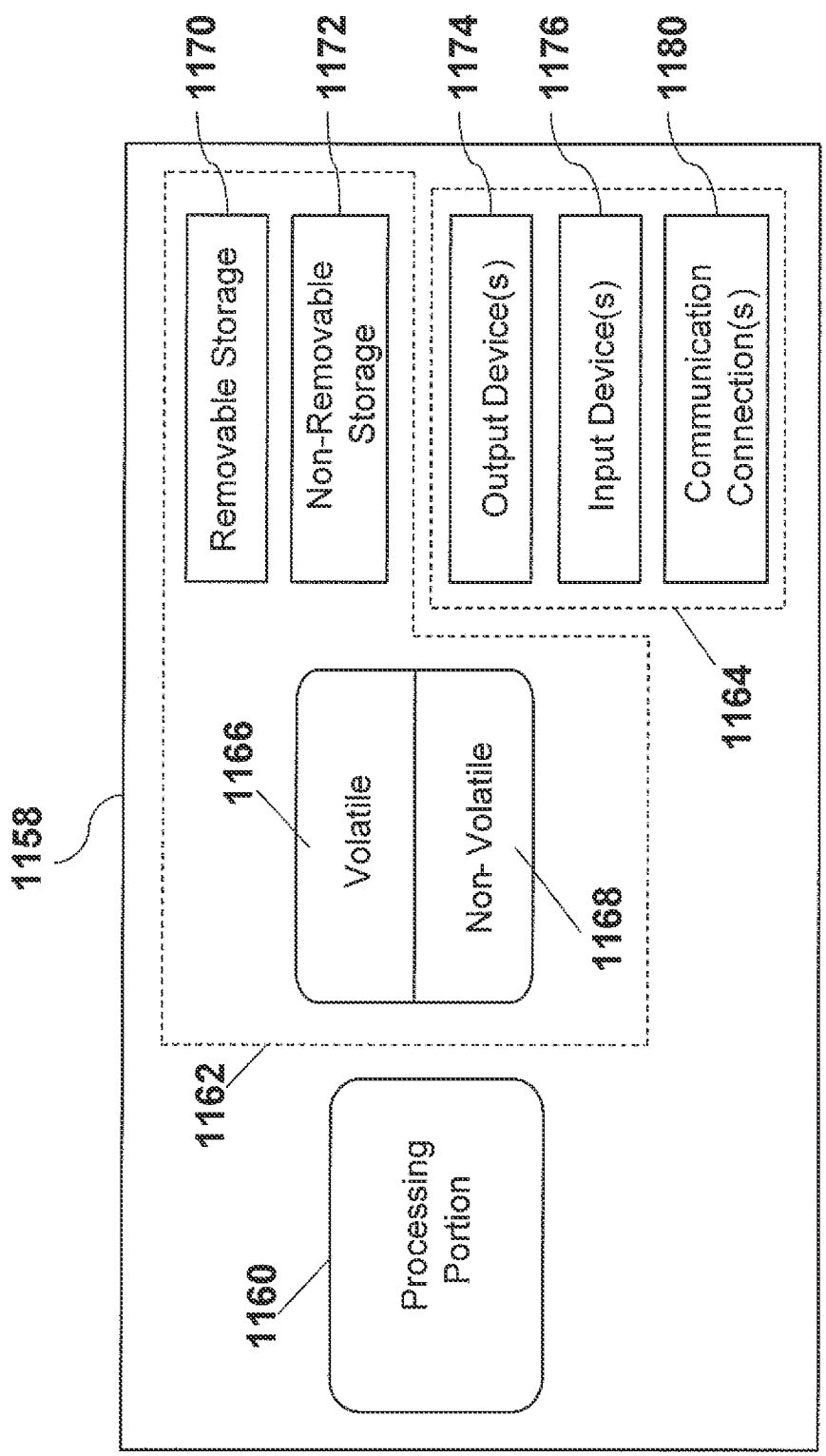
FIG. 5 is a block diagram of a non-limiting exemplary processor in which one or more disclosed embodiments may be implemented.

FIG. 5 is a block diagram of an example processor 1158 which may be employed in any of the embodiments described herein, including as one or more components of mobile devices 102 and 103, and/or any related equipment, and/or as one or more components of any third party system or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof. Processor 1158 may include circuitry and other components that enable processor 1158 to perform any of the functions and methods described herein. Such circuitry and other components may also enable processor 1158 to communicate and/or interact with other devices and components, for example any component of any device disclosed herein or any other device, in such a manner as to enable processor 1158 and such other devices and/or components to perform any of the disclosed functions and methods.

As depicted in FIG. 5, the processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for M2M emergency communications, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how M2M emergency communications may be implemented with stationary and non-stationary network structures and architectures in order to do M2M emergency communications. It can be appreciated, however, that M2M emergency communications as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, M2M emergency communications may be applied independently of the method of data transport and does not depend on any particular network architecture or underlying protocols.

Figure 6:
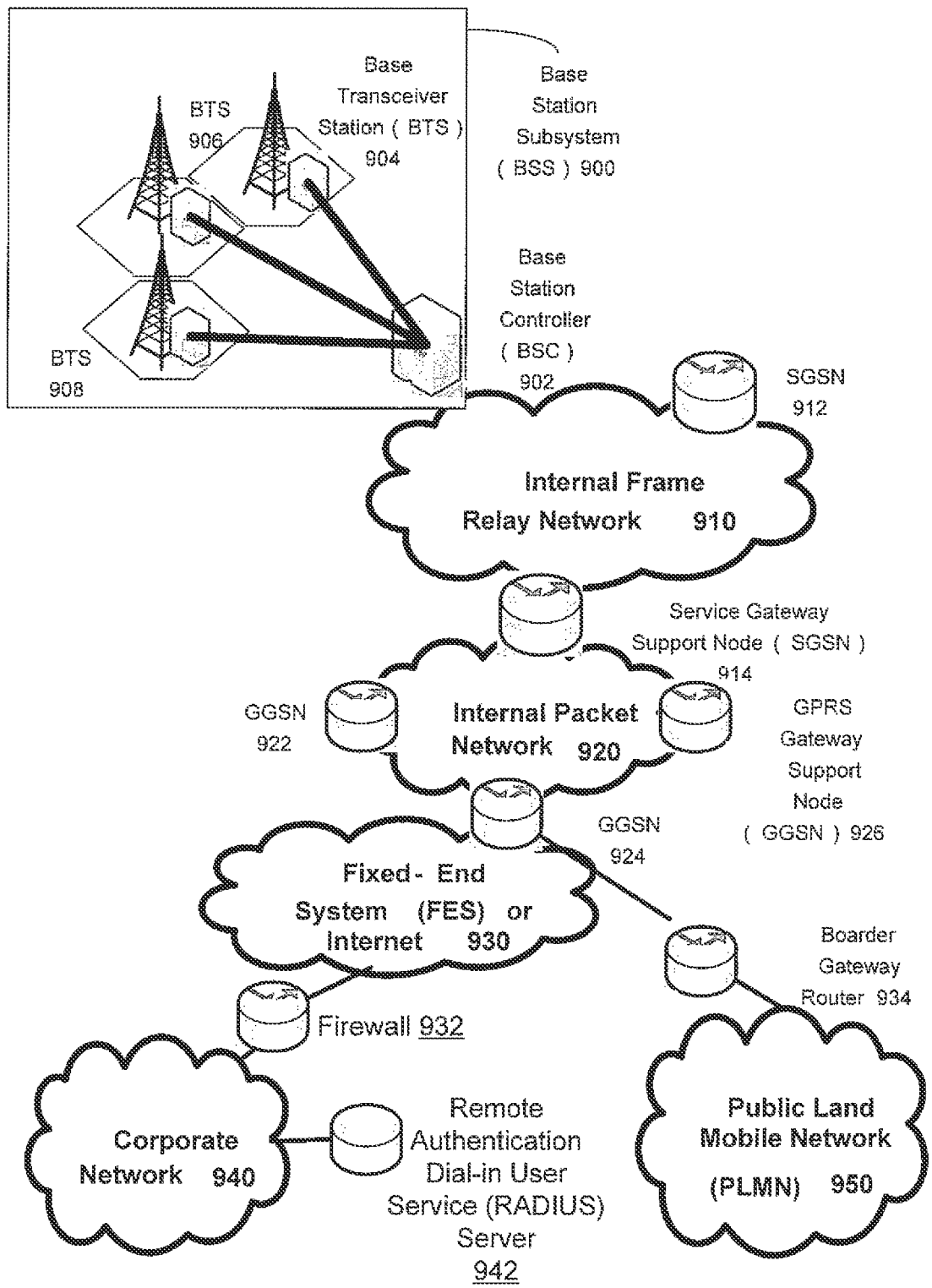
FIG. 6 is a block diagram of a non-limiting exemplary packet-based mobile cellular network environment, such as a GPRS network, in which one or more disclosed embodiments may be implemented.

FIG. 6 depicts an overall block diagram of an exemplary packet-based mobile cellular network environment, such as a GPRS network, in which M2M emergency communication systems and methods such as those described herein may be practiced. In an example configuration, any RAN as described herein may be encompassed by or interact with the network environment depicted in FIG. 6. Similarly, mobile devices 102 and 103 may communicate or interact with a network environment such as that depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 102 and 103) become connected to the wireless network. In exemplary fashion, the packet traffic originating from user devices (e.g., mobile devices 102 and 103) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
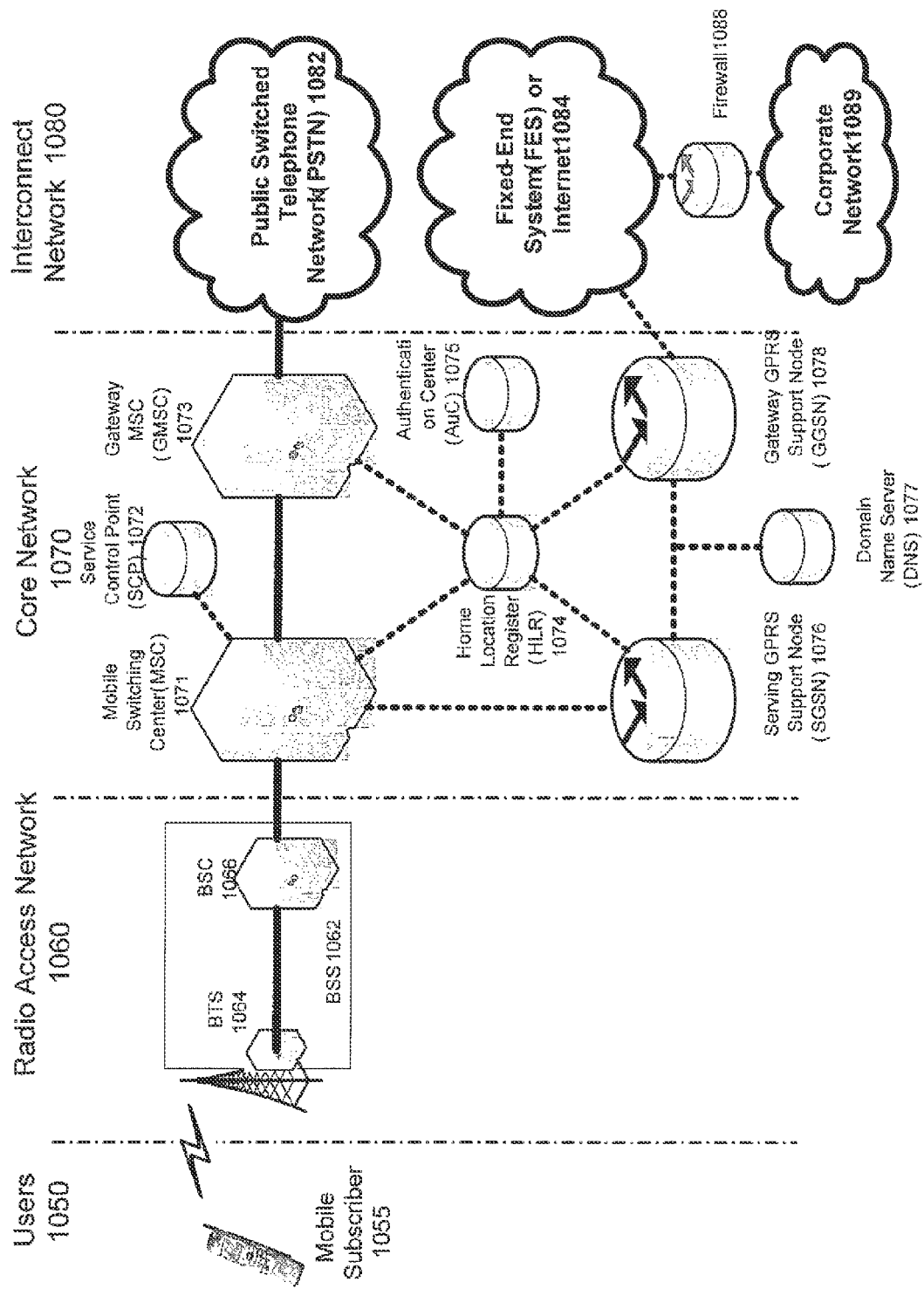
FIG. 7 illustrates a non-limiting exemplary architecture of a typical GPRS network, segmented into four groups, in which one or more disclosed embodiments may be implemented.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise any of mobile devices 102 and 103. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 102 and 103 used by an end user of a mobile cellular service or a wireless provider. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of M2M emergency communication systems and methods such as those described herein may include, but are not limited to, Gateway GPRS Support Node tables, Fixed End System router tables, firewall systems, VPN tunnels, and any number of other network elements as required by the particular digital network.

Figure 8:
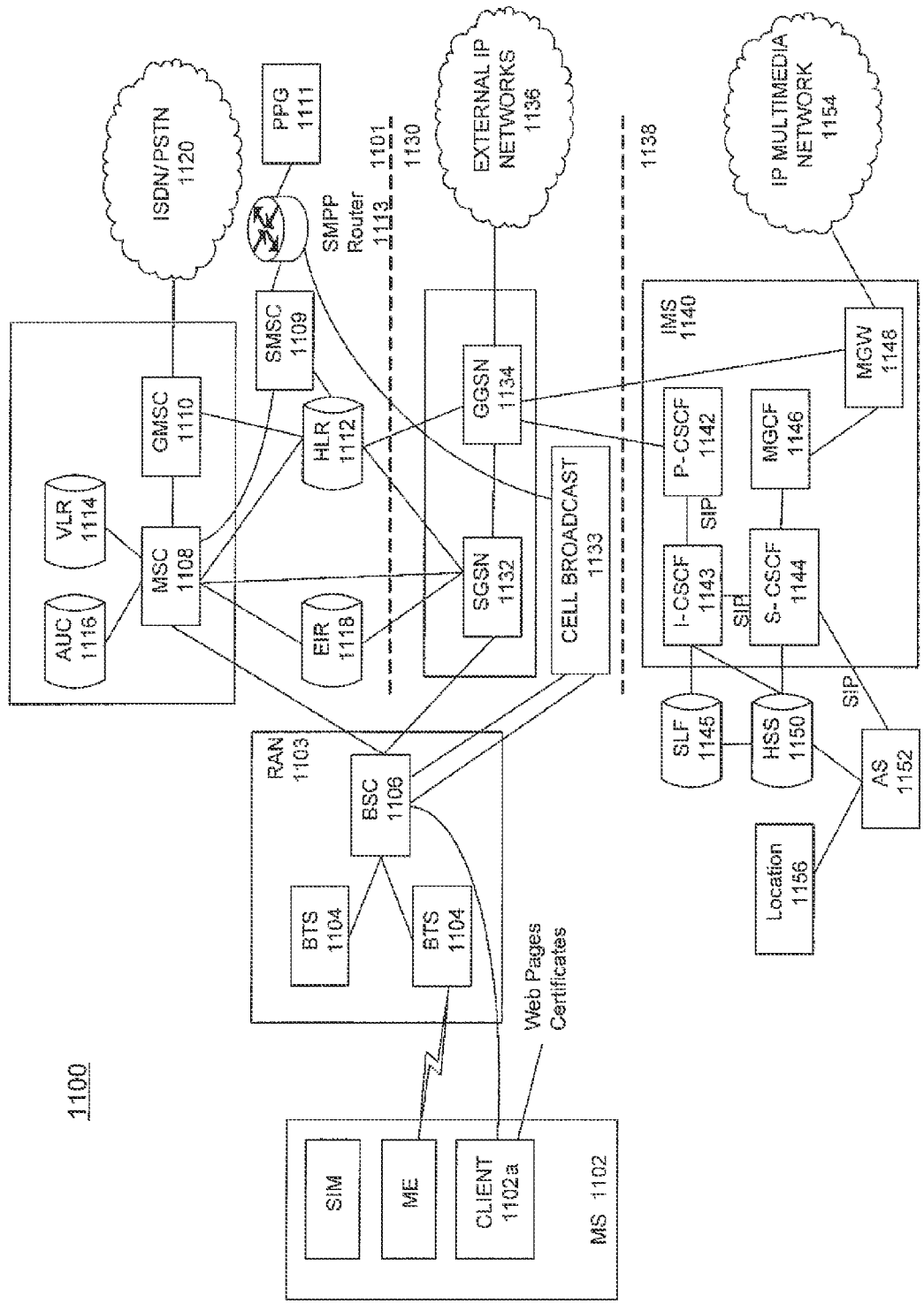
FIG. 8 illustrates a non-limiting alternate block diagram of an exemplary GSM/GPRS/IP multimedia network architecture in which one or more disclosed embodiments may be implemented.

FIG. 8 illustrates another exemplary block diagram view of a GSM/GPRS/IP multimedia network architecture 1100 in which the systems and methods for M2M emergency communications such as those described herein may be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 102 and 103) that is used by mobile subscribers, in one embodiment with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138. HSS 1150 may include multiple HSSs.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 9:
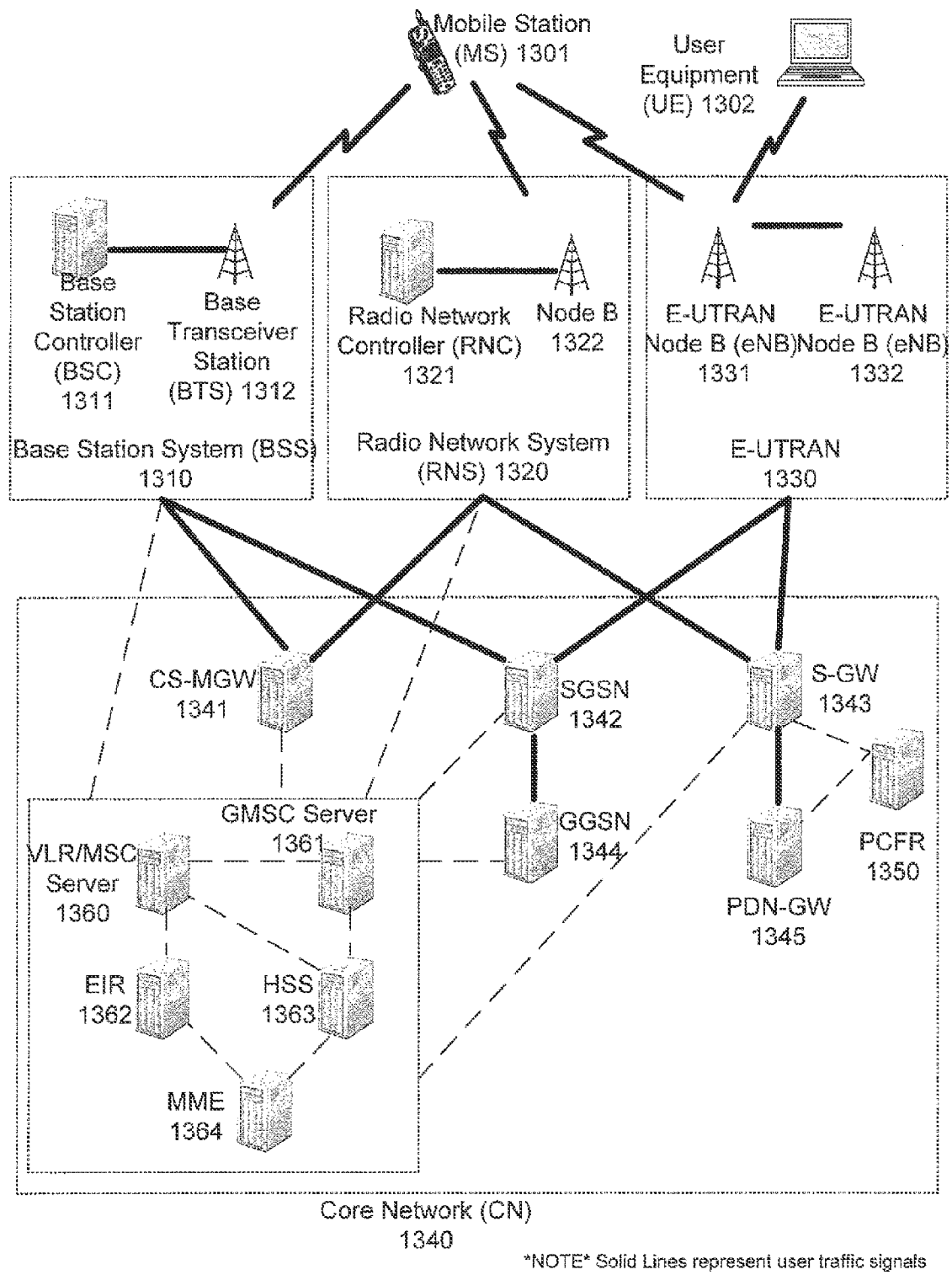
FIG. 9 illustrates a Public Land Mobile Network (PLMN) block diagram view of an exemplary architecture in which one or more disclosed embodiments may be implemented.

FIG. 9 illustrates a PLMN block diagram view of an exemplary architecture in which M2M emergency communications may be incorporated. Mobile Station (MS) 1301 is the physical equipment used by the PLMN subscriber. In one illustrative embodiment, communications device 40 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In a illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical embodiment, user equipment may be classified as either "white listed" or "black listed" depending on its status in the network. In one embodiment, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While example embodiments of systems and methods for M2M emergency communications have been described in connection with various communications devices and computing devices/processors, the underlying concepts can be applied to any communications or computing device, processor, or system capable of implementing the M2M emergency communication systems and methods described. The various techniques described herein may be implemented in connection with hardware or hardware and software. Thus, the methods and apparatuses for M2M emergency communications, or certain aspects or portions thereof, can take the form of program code (i.e., instructions) embodied in tangible and/or non-transitory media, such as floppy diskettes, CD-ROMs, hard drives, or any other machine-readable storage medium, wherein, when the program code is loaded into and executed by a machine, such as a computer, the machine becomes an apparatus for M2M emergency communications. A computer-readable storage medium, as described herein is an article of manufacture, and thus, not to be construed as a transient signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for M2M emergency communications may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for M2M emergency communications. When implemented on a general-purpose processor, the program code combines with the processor to provide a unique apparatus that operates to invoke the functionality of M2M emergency communications as described herein. Additionally, any storage techniques used in connection with M2M emergency communications may invariably be a combination of hardware and software.

While M2M emergency communication systems and methods have been described in connection with the various embodiments of the various figures, it is to be understood that other similar embodiments may be used or modifications and additions may be made to the described embodiments for performing the same function of M2M emergency communications without deviating therefrom. For example, any combination of the features or elements disclosed herein may be used in one or more embodiments. One skilled in the art will recognize M2M emergency communications as described in the present application may apply to any environment, whether wired or wireless, and may be applied to any number of such devices connected via a communications network and interacting across the network. M2M emergency communications should not be limited to any single embodiment, but rather should be construed in breadth and scope in accordance with the appended claims.

What is claimed:

1. A method comprising:
receiving, by a processor, detections associated with a first entity, wherein at least one of the detections is indicative of being from a first mobile device carried by the first entity;
determining, by the processor, a pattern of the detections associated with the first entity, wherein the pattern is based on a behavior;
assigning, based on the pattern, a first threat level associated with the first entity;
comparing the first threat level to a first threshold associated with a site in proximity of the first entity, wherein the first threshold is a high likelihood of instigating harmful act;
determining that the first threat level reaches the first threshold;
determining that a second mobile device in proximity of the first entity has an associated second threat level that does not reach the first threshold; and
responsive to the determining that the first threat level reaches the first threshold and the second threat level does not reach the first threshold, providing instructions to send an alert message to the second mobile device in proximity of the first entity, wherein the alert message comprises a request for information about the first entity from the second mobile device.

2. The method of claim 1, further comprising responsive to a determination that the first threat level reaches the first threshold, automatically disabling a weapon approximate to the location of the entity.

3. The method of claim 1, wherein the alert message comprises a questionnaire comprising questions associated with the first entity.

4. The method of claim 1, wherein the first mobile device is a smartphone of the first entity, wherein the first entity is a human.

5. The method of claim 1, wherein the first entity is a non-human living creature.

6. The method of claim 1, further comprising:
responsive to a determination that the first threat level reaches a second threshold, providing instructions to automatically limit access of the first entity to a room of a building.

7. The method of claim 1, further comprising:
responsive to a determination that the first threat level reaches a third threshold, providing instructions to automatically limit access of the first entity to a vehicle associated with the first entity.

8. A server comprising:
a processor; and
a memory coupled to the processor, the memory having stored thereon executable instructions that when executed by the processor cause the processor to effectuate operations comprising:
receiving detections associated with a first entity, wherein at least one of the detections is indicative of being from a mobile device associated with the first entity;
determining a pattern of the detections associated with the first entity, wherein the pattern is based on a behavior;
assigning, based on the pattern, a first threat level associated with the first entity;
comparing the first threat level to a first threshold associated with a site in proximity of the first entity;
determining that the first threat level reaches the first threshold, wherein the first threshold is a high likelihood of instigating harmful act;
determining that a second mobile device in proximity of the first entity has an associated second threat level that does not reach the first threshold; and
responsive to the determining that the first threat level reaches the first threshold and the second threat level does not reach the first threshold, providing instructions to send an alert message to the second mobile device in proximity of the first entity, wherein the alert message comprises a request for information about the first entity from the second mobile device.

9. The server of claim 8, wherein the first entity is a person.

10. The server of claim 8, wherein at least one of the detections indicative of being from:
a finger print detector;
an iris detector;
a facial recognition detector;
a voice recognition detector;
a voice volume detector; or
a camera.

11. The server of claim 8, wherein at least one of the detections indicative of being from:
a gas detector;
a wind detector;
a water level detector; or
a camera.

12. The server of claim 8, wherein the first entity is a non-human living creature.

13. The server of claim 8, further operations comprising:
responsive to a determination that the first threat level reaches a second threshold, providing instructions to automatically limit access of the first entity to a room of a building.

14. The server of claim 8, further operations comprising:
responsive to a determination that the first threat level reaches a third threshold, providing instructions to automatically limit access of the first entity to a vehicle associated with the first entity.

15. A computer readable storage medium comprising computer executable instructions that when executed by a computing device cause said computing device to effectuate operations comprising:
receiving detections associated with a first entity, wherein at least one of the detections is indicative of being from a mobile device associated with the first entity;
determining a pattern of the detections;
assigning, based on the pattern, a first threat level associated with the first entity;
comparing the first threat level to a first threshold associated with a site in proximity of the first entity, wherein the first threshold is a high likelihood of instigating harmful act;
determining that the first threat level reaches the first threshold;
determining that a second mobile device in proximity of the first entity has an associated second threat level that does not reach the first threshold; and
responsive to the determining that the first threat level reaches the first threshold and the second threat level does not reach the first threshold, providing instructions to send an alert message to the second mobile device in proximity of the first entity, wherein the alert message comprises a request for information about the first entity from the second mobile device.

16. The computer readable storage medium of claim 15, further operations comprising responsive to a determination that the first threat level reaches the first threshold, automatically:
  disabling a weapon approximate to the location of the entity; or
  disabling a function of a vehicle approximate to the location of the entity.

17. The computer readable storage medium of claim 15, wherein at least one of the detections indicative of being from:
  a finger print detector;
  an iris detector;
  a facial recognition detector;
  a voice recognition detector;
  a voice volume detector; or
  a camera.

18. The computer readable storage medium of claim 15, wherein at least one of the detections indicative of being from:
  a gas detector;
  a wind detector;
  a water level detector; or
  a camera.

19. The computer readable storage medium of claim 15, wherein the first entity is a non-human living creature.

20. The computer readable storage medium of claim 15, further operations comprising:
  responsive to a determination that the first threat level reaches a third threshold, providing instructions to automatically limit access of the first entity to a vehicle associated with the first entity.

* * * * *